(12) United States Patent
Wetenkamp et al.

(10) Patent No.: US 6,790,131 B2
(45) Date of Patent: Sep. 14, 2004

(54) FIELD TERMINATION KIT FOR FIBER CONNECTOR

(75) Inventors: Daniel B. Wetenkamp, Apple Valley, MN (US); Charles J. Rogers, Mounds View, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 276 days.

(21) Appl. No.: 10/055,607

(22) Filed: Jan. 22, 2002

(65) Prior Publication Data

US 2003/0139118 A1 Jul. 24, 2003

(51) Int. Cl.⁷ .................................................. B24B 1/00
(52) U.S. Cl. ........................ 451/42; 269/287; 451/364; 451/460
(58) Field of Search ............................... 451/28, 41, 42, 451/364, 365, 378, 384, 386, 390, 391, 460; 269/287; 385/56, 60, 78, 137

(56) References Cited

U.S. PATENT DOCUMENTS

| | | | | |
|---|---|---|---|---|
| 5,018,316 A | * | 5/1991 | Mulholland et al. | ......... 451/364 |
| 5,201,148 A | * | 4/1993 | Rupert et al. | ............... 451/364 |
| 5,643,064 A | * | 7/1997 | Grinderslev et al. | ........ 451/378 |
| 6,142,676 A | | 11/2000 | Lu | |
| 6,672,772 B2 | * | 1/2004 | Gimbel et al. | ................ 385/60 |

OTHER PUBLICATIONS

"ADC FasTerm™ Multimode LX.5 Connector Installation Instructions", *ADC Telecommunications*, Issue 1, 27 pgs. (Jun. 1999).
"Assembly Instructions for LC™ Fiber Optic Behind–The–Wall (BTW) Connectors", *Lucent TechnologiesBell Lab Innovations*, Issue 3, 35 pgs. (Jul. 1999).
Drawings of a polishing puck product by ADC Telecommunications, Inc., 9 pgs. (Last revised Jan. 2, 2001).
"ADC FasTerm™ Multimode LX.5™ Connector Installation Instructions", *ADC Telecommunications*, Issue 2, 25 pgs. (Apr. 2001).

* cited by examiner

Primary Examiner—Hadi Shakeri
(74) Attorney, Agent, or Firm—Merchant & Gould P.C.

(57) ABSTRACT

A polishing puck assembly is provided for use in polishing a fiber optic connector. A slidable weight rests on the fiber optic connector to urge the ferrule of the fiber optic connector to extend below a bottom surface of the puck assembly. The puck assembly can be manipulated relative to polishing material to polish the end of the fiber optic connector. The polishing material can be circular in shape and held by a palette defining one or more circular pockets for holding the polishing material. Different polishing material can be positioned in the different pockets. A circular guide can be utilized in the circular pocket wherein the guide includes a circular opening with a center offset from a center of the circular guide.

12 Claims, 13 Drawing Sheets

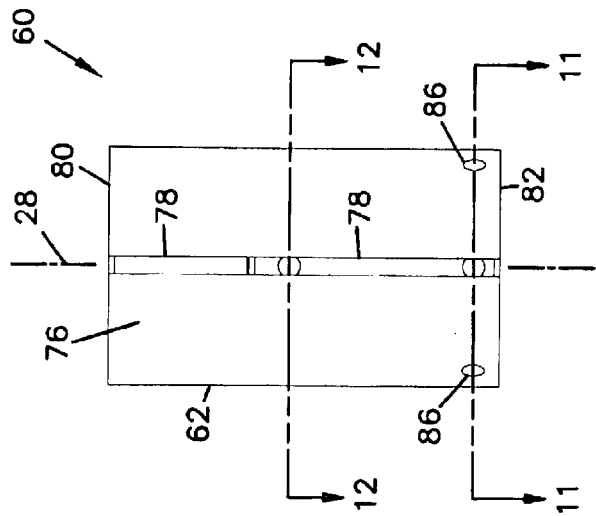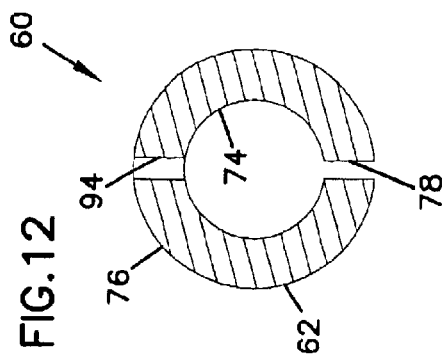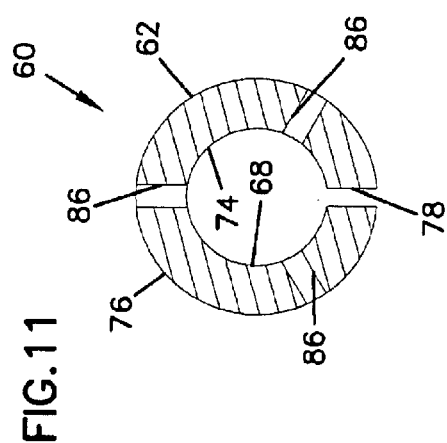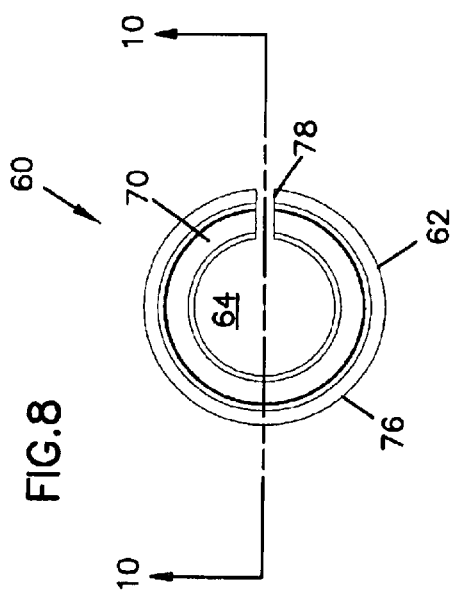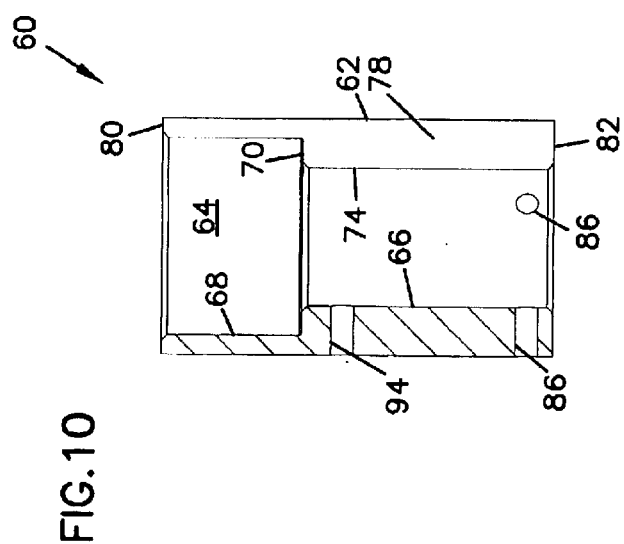

FIELD TERMINATION KIT FOR FIBER CONNECTOR

FIELD OF THE INVENTION

The present invention relates to fiber optic connectors, assembly systems and methods, and kits for assembling fiber optic connectors.

BACKGROUND OF THE INVENTION

Fiber optic connectors terminate the end of fiber optic cables. SC-type, FC-type, and ST-type are known fiber optic connectors. Another fiber optic connector is shown for example in U.S. Pat. No. 6,142,676, assigned to ADC Telecommunications, Inc.

The connector structure is mounted on the end of the fiber optic cable to terminate the cable. The connector mates with an adapter for signal transmission from the connector to a second connector mated to the adapter. The optical fiber portion of the cable terminates at an end of the connector, typically at a ferrule. Prior to use, the end of the connector including the optical fiber is polished.

An improperly assembled connector, including an improperly or poorly polished end face can lead to failure or poor performance of the connector. Field installation systems are known for terminating fiber optic cable including a polishing puck for holding the connector during polishing. In a field termination, the fiber is first glued to the ferrule of the connector. Once the connector is assembled, the end face is polished. The polishing puck is held by the user and moved relative to polishing material to polish the connector end face. Consistent results and ease of use are some of the concerns in fiber termination. Improvements are desired.

SUMMARY OF THE INVENTION

The present invention includes a polishing puck assembly for use in holding a fiber optic connector. A puck member includes a planar bottom and a hole through the bottom for receipt of the fiber. A weight is slideably positioned on the puck member to rest on the connector to apply a downward force on the connector relative to the puck member. The puck member and the weight define a chamber for receipt of the connector, wherein the weight rests on the connector, and the optical fiber protrudes through the hole of the puck member.

A palette is provided for holding the polishing material. A cylindrical pocket is defined by the palette for holding one or more circular layers of the polishing material, such as a top polishing film and supporting layers of foam, plastic, or other materials. Multiple pockets can be provided in the palette, for supporting different polishing layers and support layers used during successive steps in the polishing operation.

A polishing guide can be used in the cylindrical pocket to reduce the available polishing area, and to provide a polishing guide surface. The guide includes an outer cylindrical surface, and an inner cylindrical surface with an offset axis relative to the outer cylindrical surface.

A method of polishing is provided where a fiber optic connector is positioned in a puck member, and a weight is slideably mounted to the puck member and rests on the fiber optic connector. The puck member is moved relative to a polishing surface to polish the fiber protruding from the puck member.

A further method includes providing a palette having a plurality of pockets for holding different sheets of polishing material. A fiber optic connector is polished by successively polishing the end face in different pockets.

BRIEF DESCRIPTION OF THE DRAWINGS

FIG. 8 is a top view of the puck top of the puck assembly of FIG. 1.

FIG. 9 is a side view of the puck top of FIG. 8.

FIG. 10 is a cross-sectional side view of the puck top through line 10—10 of FIG. 8.

FIG. 11 is a cross-sectional top view of the puck top through line 11—11 of FIG. 9.

FIG. 12 is a cross-sectional top view of the puck top through line 12—12 of FIG. 9.

DETAILED DESCRIPTION OF THE PREFERRED EMBODIMENTS

Figure 2:
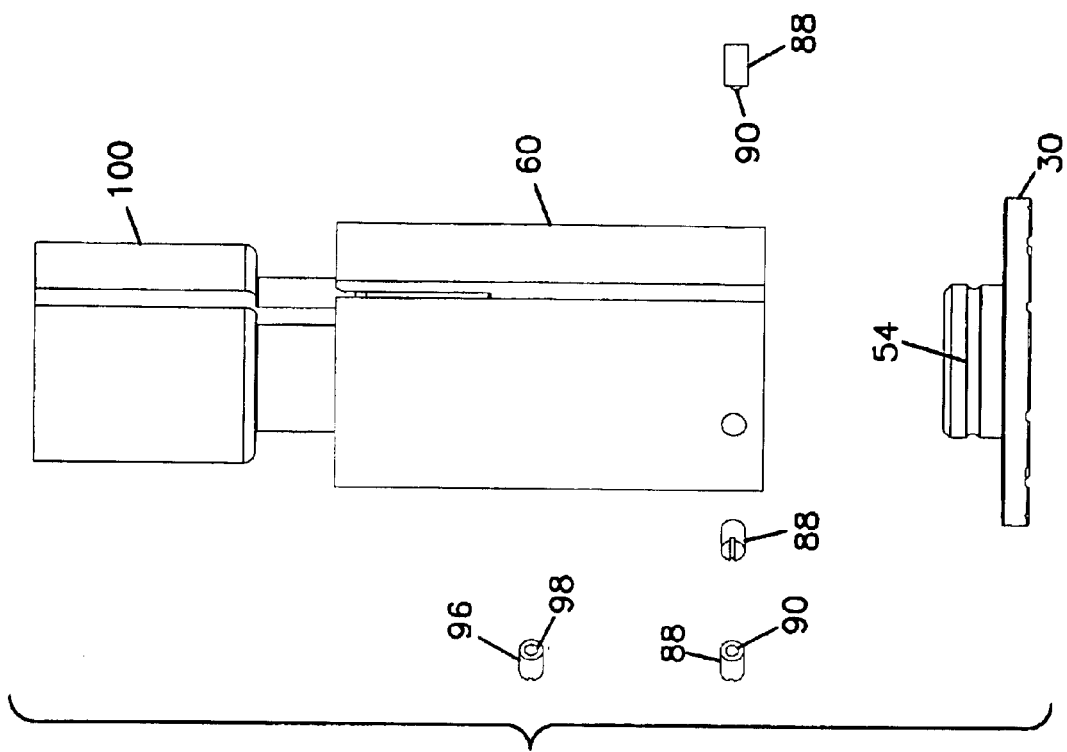
FIG. 2 is an exploded side view of the polishing puck assembly of FIG. 1.
Figure 1:
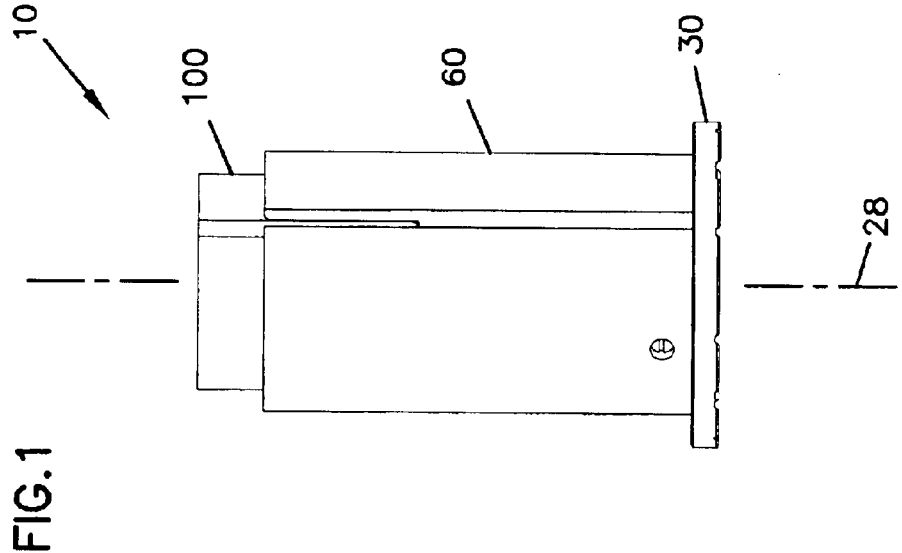
FIG. 1 is a side view of a polishing puck assembly in accordance with the present invention.

Referring now to FIGS. 1–3, 24, and 25, a puck assembly 10 is shown for use in polishing fiber optic connector 12. More specifically, puck assembly 10 can be used to hold connector 12 in a proper position relative to a polishing surface for use in polishing an end face 14 of connector 12. End face 14 includes a ferrule 16 which holds a fiber 18. The polishing surface and methods for conducting the polishing operation will be described in greater detail below.

Figure 3:
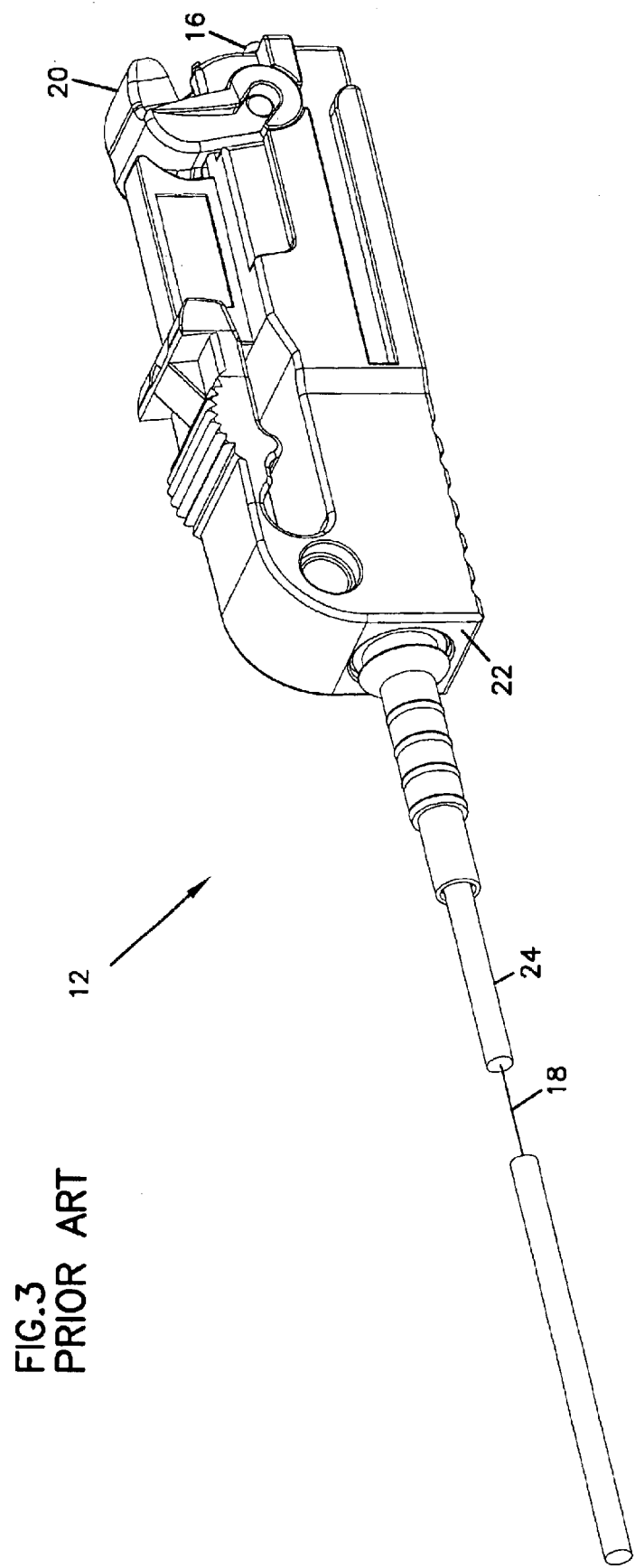
FIG. 3 is a perspective view of a fiber optic cable with a portion of the jacket broken away and terminated with a fiber optic connector of the type in U.S. Pat. No. 6,142,676.
Figure 4:
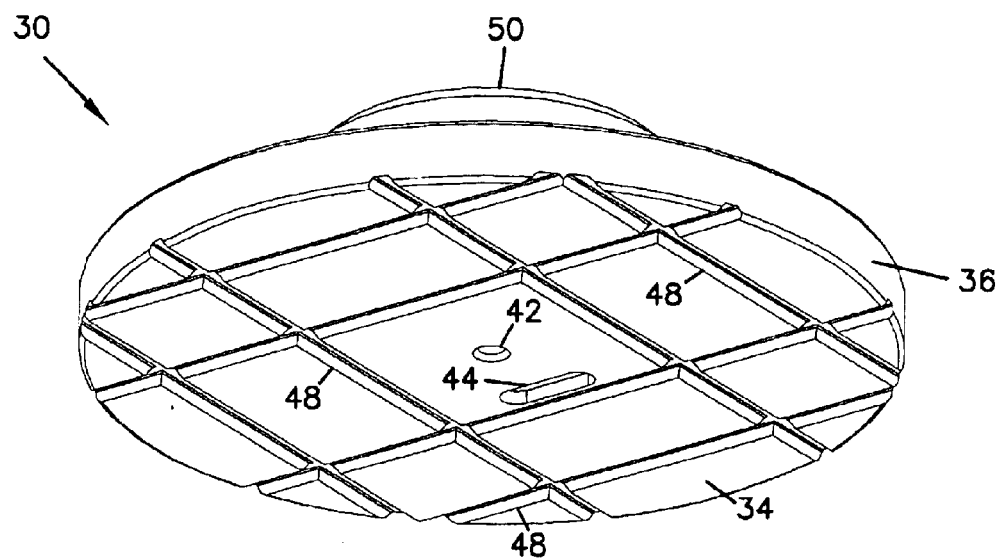
FIG. 4 is a bottom perspective view of the puck base of the puck assembly of FIG. 1.
Figure 6:
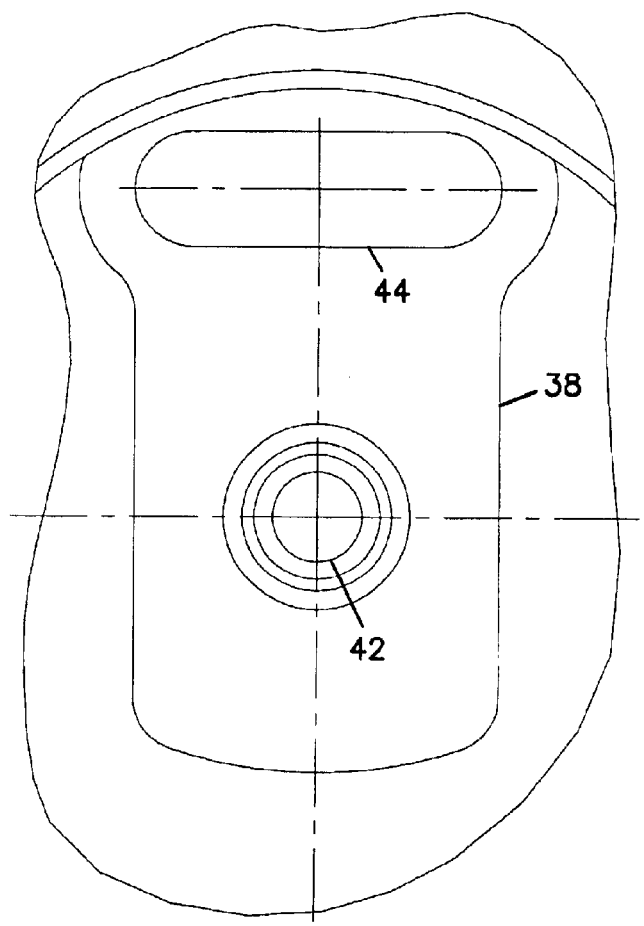
FIG. 6 is an enlarged top view of the nest portion of the puck base.
Figure 5:
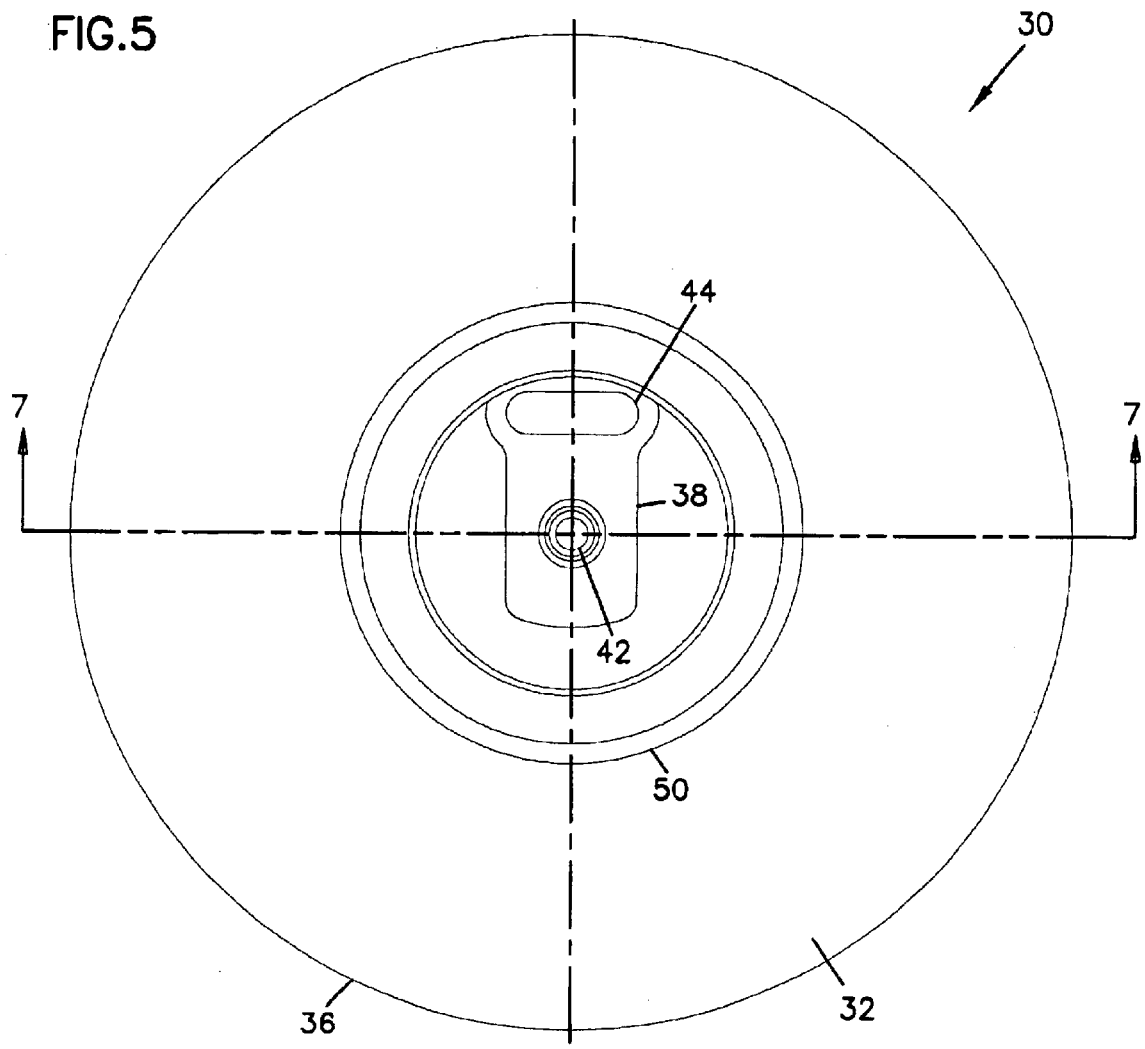
FIG. 5 is a top view of the puck base of FIG. 4.
Figure 7:
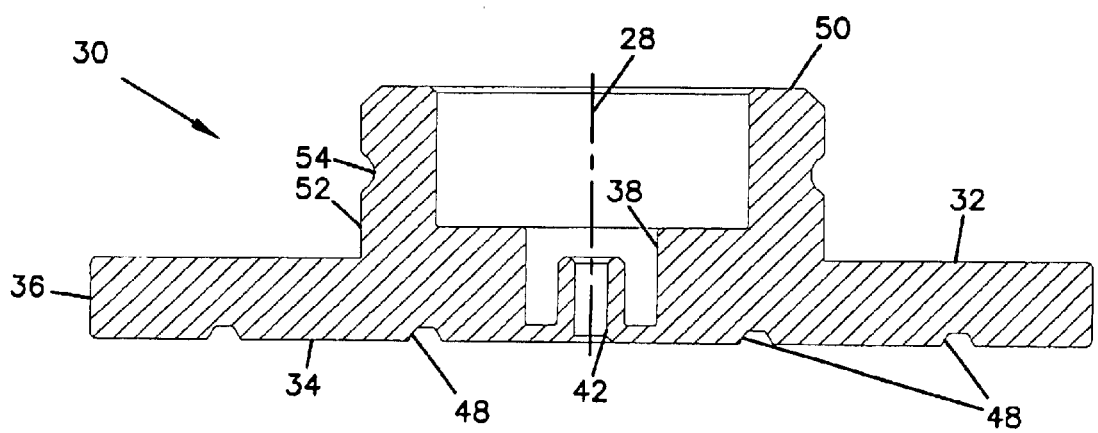
FIG. 7 is a cross-sectional side view of the puck base of FIG. 5 through line 7—7.
Figure 13:
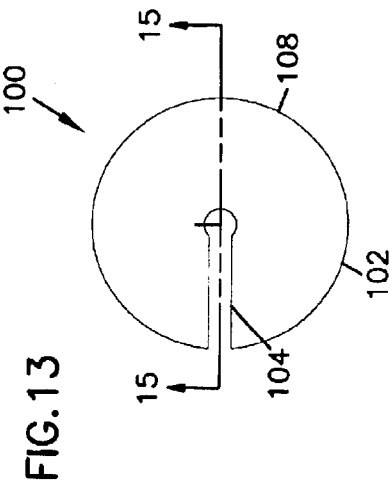
FIG. 13 is a top view of the weight of the puck assembly of FIG. 1.
Figure 14:
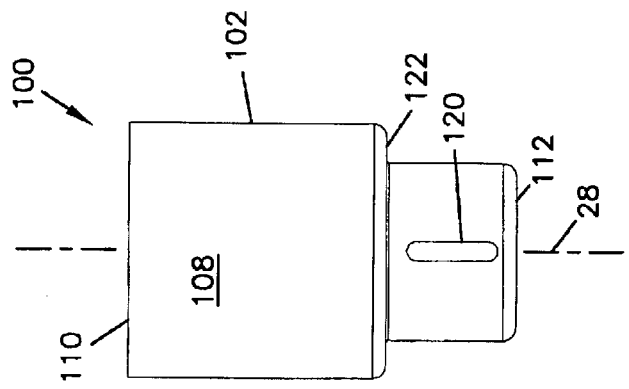
FIG. 14 is a side view of the weight of FIG. 13.
Figure 15:
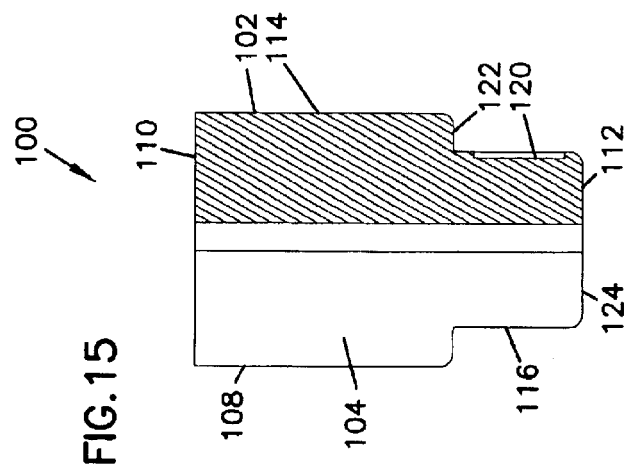
FIG. 15 is a cross-sectional side view of the weight through line 15—15 of FIG. 13.
Figure 16:
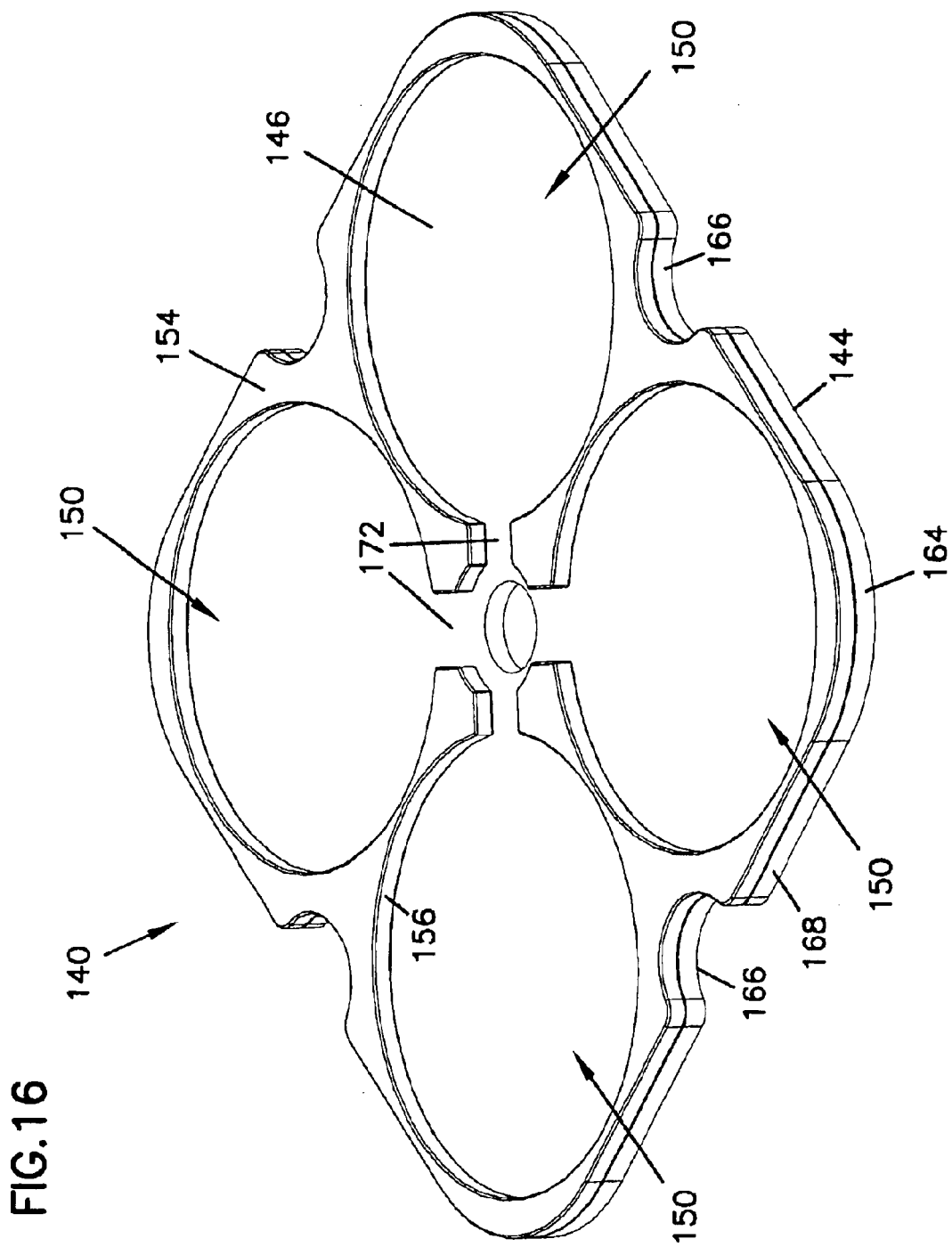
FIG. 16 is a top perspective view of a palette used with the puck assembly of FIG. 1.

The fiber optic connector 12 is of the type shown in U.S. Pat. No. 6,142,676, the disclosure of which is hereby incorporated by reference. Connector 12 terminates an end of cable 24. As shown in FIG. 3, pivoting cover or shutter 20 is shown in the open position, to expose the ferrule 16, and fiber 18, at end face 14, for polishing. Puck assembly 10 is sized for connector 12. Other connectors, such as ST, SC, FC and other types can be polished with the devices and methods disclosed herein. In some cases, it may be necessary to reconfigure puck assembly 10 to fit a different connector size or type.

Referring now to FIGS. 1, 2, 4–7, 24, and 25, puck assembly 10 includes a puck base 30 having a top surface 32, and an opposite facing bottom surface 34. An edge surface 36 extends between the top and bottom surfaces 32, 34. A nest 38 receives an end of connector 12. Nest 38 includes a center hole 42 for receipt of the ferrule 16. Puck base 30 also includes a slotted hole 44 for a pivoting cover 20 of connector 12. A center ring 50 of puck base 30 includes an outside surface 52, and an outwardly facing groove 54 for use in connecting puck base 30 to a puck top 60. Edge surface 36 is circular with a center at axis 28. Hole 42 is also preferably centered at axis 28.

Bottom surface 34 of puck base 30 includes a plurality of grooves 48. Grooves 48 are linear, and are provided in a crosshatched pattern. Grooves 48 are provided for receipt of fluid, and/or particulate present during the polishing operation. Further details about the polishing operation will be discussed in greater detail below.

Referring now to FIGS. 1, 2, 8–12, 24, and 25, puck top 60 includes a tubular body 62 defining a center bore 64 about axis 28. Center bore 64 has a lower portion 66 and an upper portion 68 with a diameter greater than the diameter of lower portion 66. A shoulder 70 is defined between upper and lower portions 66, 68. Tubular body 62 includes an inside surface 74, and an outside surface 76. A slot 78 extends between the inside and outside surfaces 74, 76 between first and second ends 80, 82.

Tubular body 62 of puck top 60 includes three equally spaced transverse, threaded bores 86 for receipt of threaded ball plungers 88. Ball plungers 88 are threaded into bores 86 so that a portion projects into bore 64. Ball plungers 88 are spring loaded with ball portions 90 biased inwardly relative to tubular body 62. Ball portions 90 of ball plungers 88 cooperate with groove 54 of puck base 30 to secure puck top 60 to puck base 30. Because of the spring-biased nature of ball plungers 88, the connection between puck top 60 and puck base 30 is a quick connect and disconnect.

Tubular body 62 of puck top 60 includes an upper transverse threaded bore 94 for receipt of a threaded ball plunger 96. Ball plunger 96 is threadably positioned in bore 94 with ball portion 98 projecting inwardly relative to tubular body 62. Ball plunger 96 is used to secure a weight 100 to puck top 60.

Figure 25:
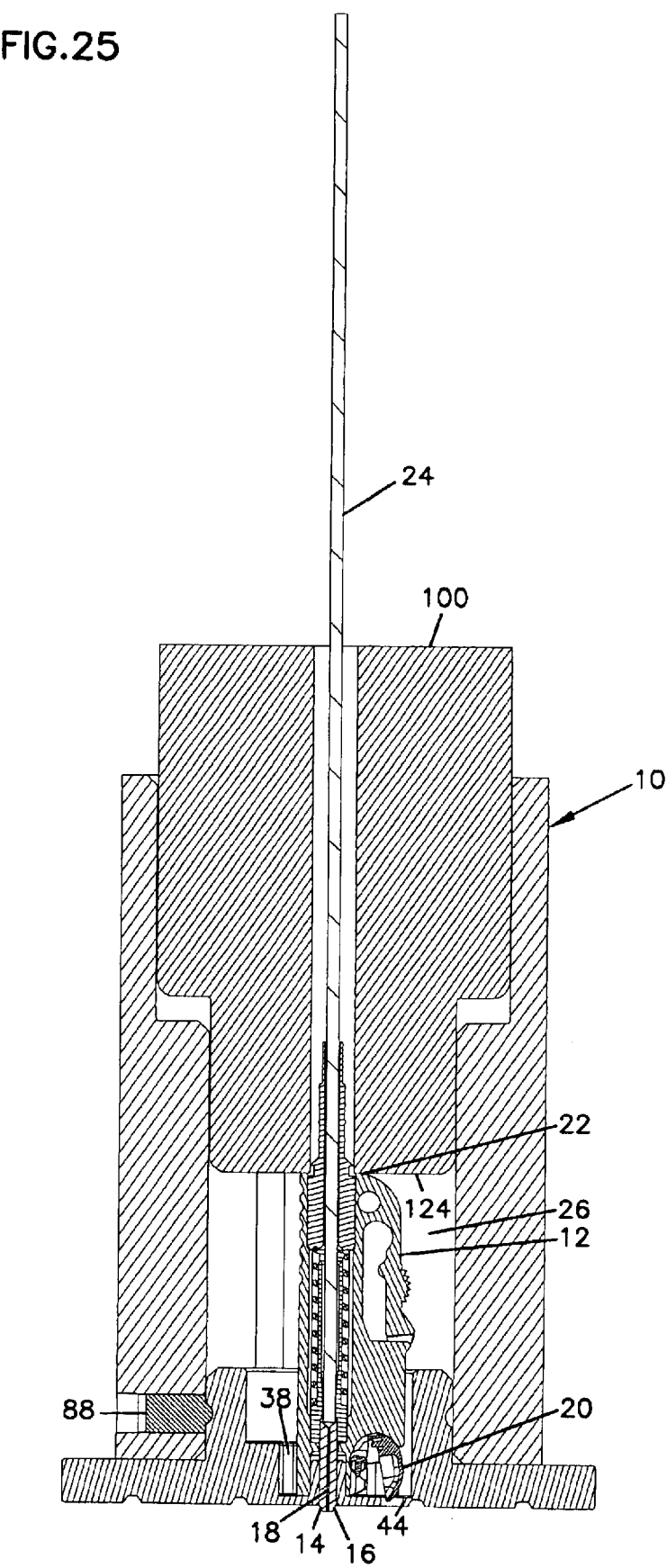
FIG. 25 shows in cross-sectional view the connector of FIG. 3 positioned in the puck assembly ready for polishing.

Referring now to FIGS. 1, 2, 13–15, 24, 25, weight 100 includes a body portion 102 including a slot 104 extending from adjacent center axis 28 to outer surface 108. Slot 104 further extends from top end 110 to bottom end 112. An upper portion 114 of body portion 102, generally cylindrical in shape, is received in upper portion 68 of puck top 60. A lower portion 116 of body portion 102, generally cylindrical in shape, is received in lower portion 66 of puck top 60. Weight 100 is used to engage a back end 22 of connector 12, as shown in FIG. 25. Upper portion 114 has a greater diameter than lower portion 116. Shoulder 70 of puck top 60 engages a shoulder 122 to prevent weight 100 from falling through puck top 60.

Lower portion 116 of weight 100 includes a longitudinally extending groove 120 which receives ball portion 98 of ball plunger 96 to secure weight 100 to puck top 60. Groove 120 is longitudinally shaped to allow for weight 100 to slidably move relative to puck top 60, yet be retained. The use of spring biased ball plunger 96 allows for quick connect and disconnect. During use, lower facing surface 124 of weight 100 rests against back end 22 of connector 12 to supply an appropriate down force on connector 12 to properly position end face 14 of connector 12 against the polishing material.

Puck assembly 10 can be made of any convenient material, such as metal. Weight 100 can be varied in size or density to vary the force applied to connector 12.

To mount connector 12 to puck assembly 10, ferrule 16 is positioned in center hole 42, and cover 20 is positioned in slotted hole 44 of puck base 30 within nest 38. Next, puck top 60 is positioned over puck base 30 by passing the cable 24 through slot 78. Puck top 60 and puck base 30 are pressed together in the axial direction which allows ball plungers 88 of puck top 60 to engage groove 54 of puck base 30. Next, weight 100 is positioned over the cable by receiving the cable in slot 104. Weight 100 is secured to puck top 60 with ball plunger 96 by pressing the two together in the axial direction. Once assembled, connector 12 is positioned in chamber 26 of puck assembly 10, and the end face 14 protrudes in the manner shown in FIG. 25, ready for polishing.

Referring now to FIGS. 16–20, a tray or palette 140 and various polishing elements 142a–d are shown. Palette 140 includes a base 144 having a top surface 146. Top surface 146 supports polishing film 142d, and any underlying optional elements, such as sheets 142a–c, as will be described below. By moving puck assembly 10 with projecting end face 14 of connector 12 relative to polishing film 142d, polishing of end face 14 is achieved.

Palette 140 includes a polishing region 150, formed as a pocket. The pocket construction helps hold the polishing elements so that only the puck assembly needs to be moved, while the palette is held against a tabletop surface, for example. The pocket construction holds the stack 151 of circular polishing materials 142a–d. Circular shapes to materials 142a–d allow for more surface area to be used relative to a square shape which tends to have unused corners where the puck assembly cannot reach.

Preferred palette 140 includes four polishing regions 150a–d, although more or less polishing regions can be provided, including only one. By using multiple regions 150, different polishing elements can be located on palette 140 simultaneously. Different polishing elements may be used in successive steps to polish end face 14 of connector 12.

Figure 17:
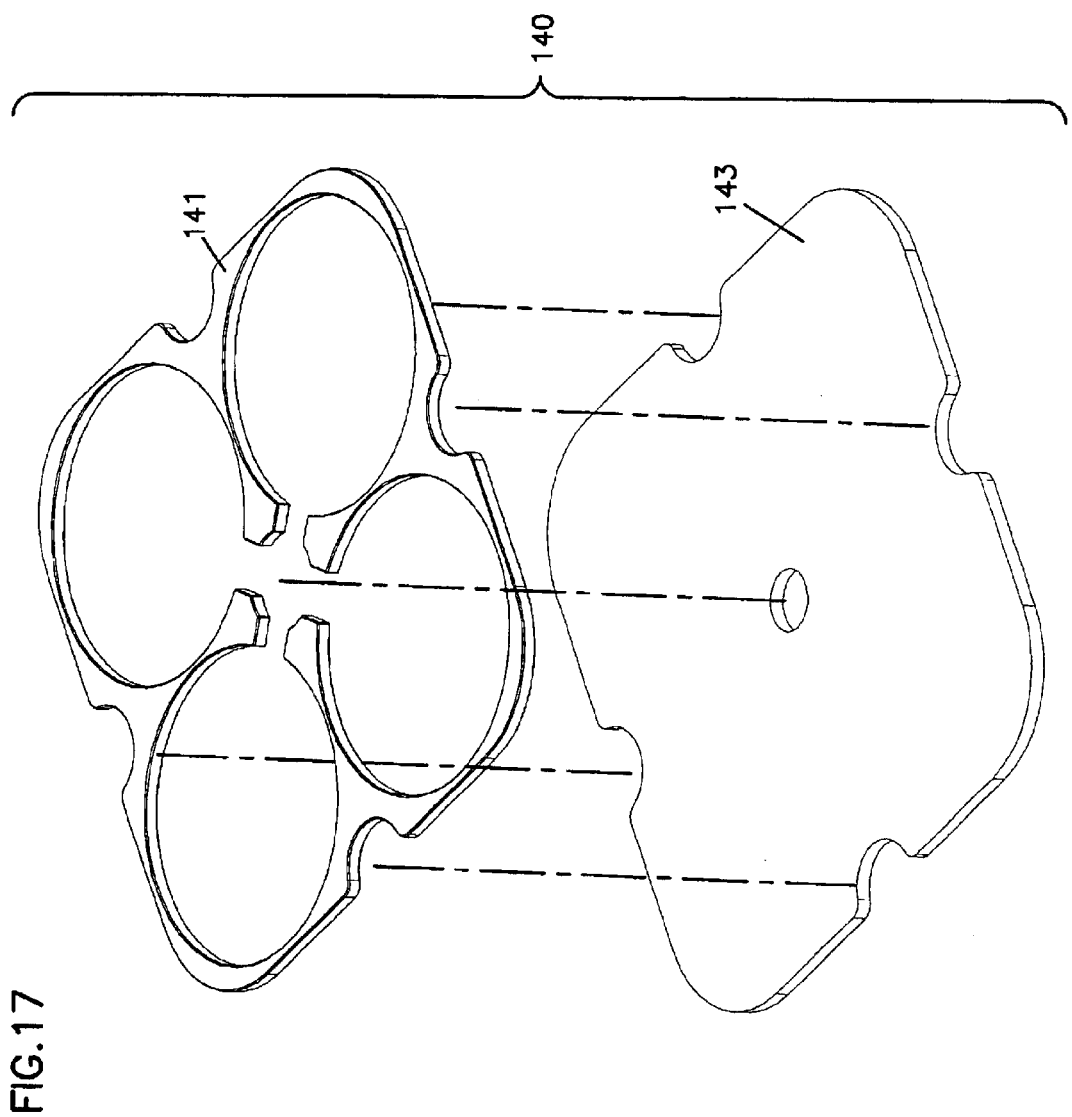
FIG. 17 is an exploded top perspective view of the palette of FIG. 16.

Palette 140 includes side portion 154 which defines the sidewalls 156 of each polishing region 150. Palette 140 can be a two-piece design glued together with a top piece 141, and a bottom piece 143, as shown in FIG. 17, or a one-piece design molded or machined. Palette can be made from plastic or other material as desired.

Palette 140 includes a side edge 164 with thumb notches or cutouts 166 positioned one per side 168. Palette 140 further includes a center hole 170, such as for receipt of a finger. Palette 140 can be used by placing it directly on a tabletop. Alternatively, the center hole 170 and side cutouts 166 can be used to hold palette 140 in the user's hand by the thumb and a finger.

Gaps 172 in sidewalls 156 allow for a user to lift the polishing material from region 150. The polishing material can be changed for a successive step in the polishing operation, or it can be discarded and replaced if used up.

Figure 18:
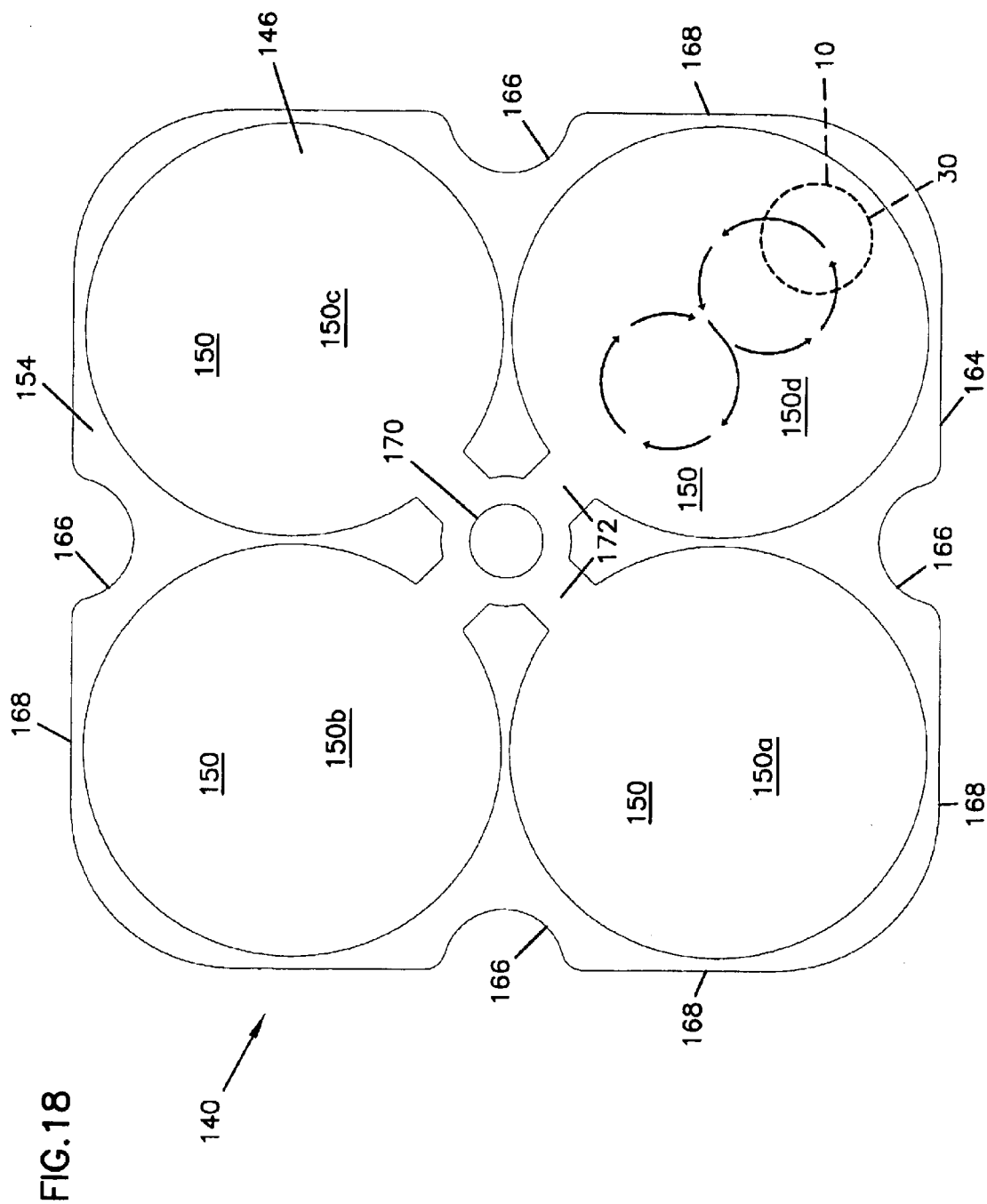
FIG. 18 is a top view of the palette with the puck assembly shown in phantom lines, and lines of motion shown by arrows.
Figure 19:
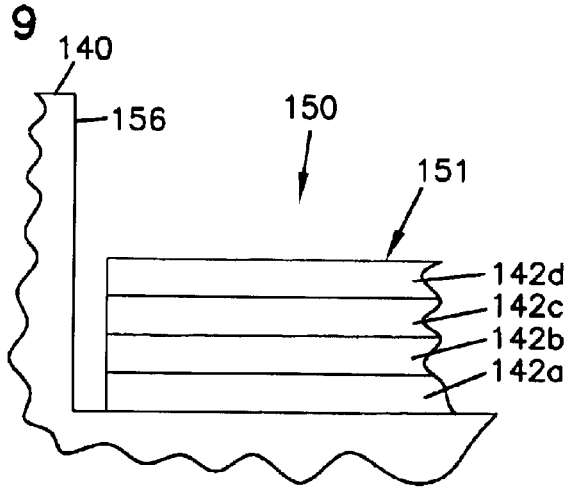
FIG. 19 is a side view of the palette in schematic form showing various layers received in one of the pockets of the palette.
Figure 20:
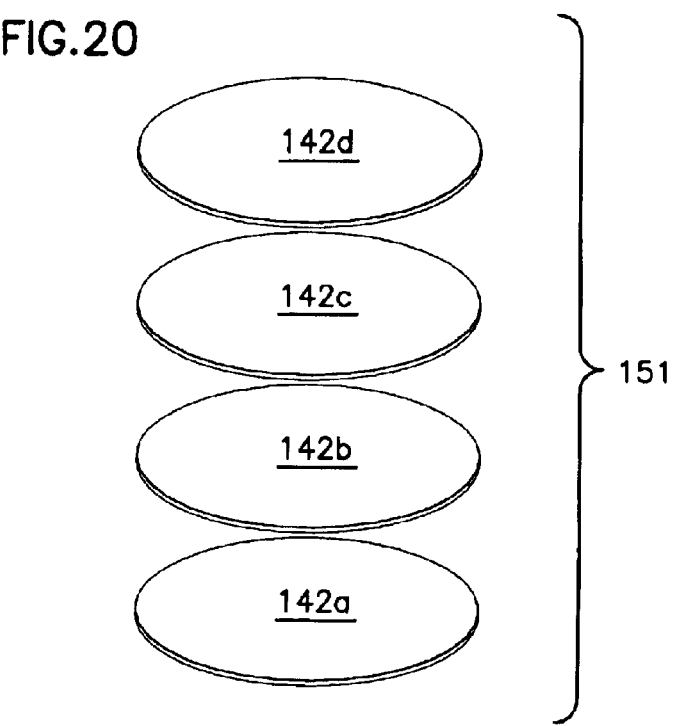
FIG. 20 is an exploded top perspective view of the layers shown in FIG. 19.
Figure 23:
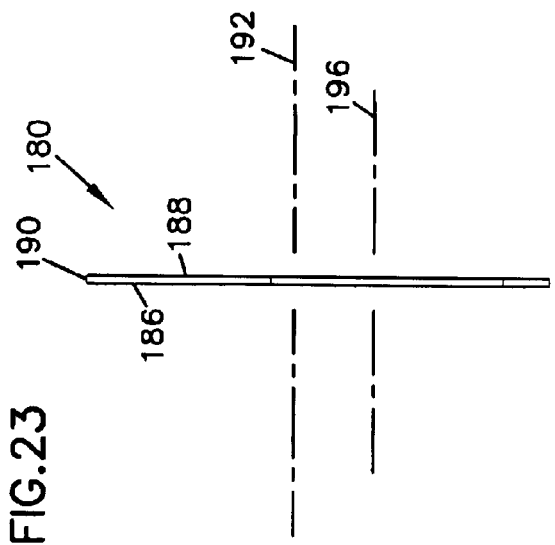
FIG. 23 is a side view of the polishing guide of FIG. 21.
Figure 21:
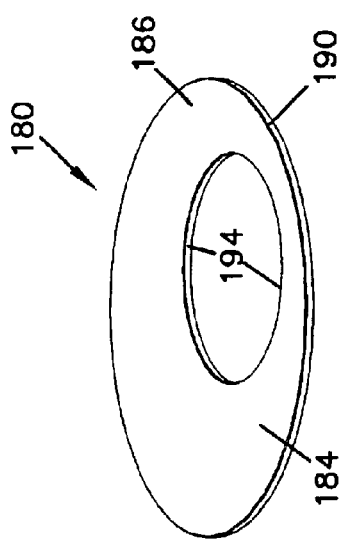
FIG. 21 is a top perspective view of a polishing guide used with the palette of FIG. 16.
Figure 22:
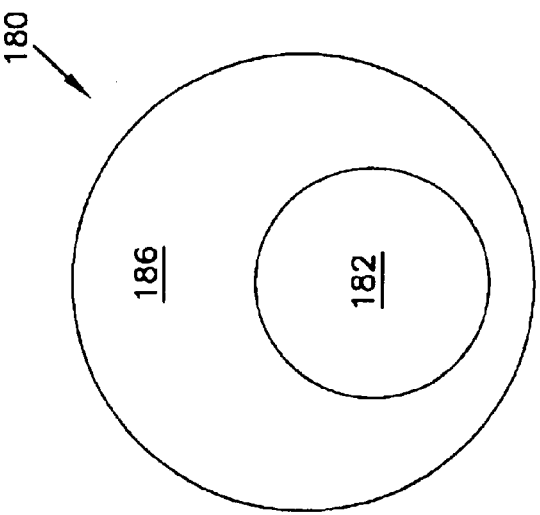
FIG. 22 is a top view of the polishing guide of FIG. 21.
Figure 24:
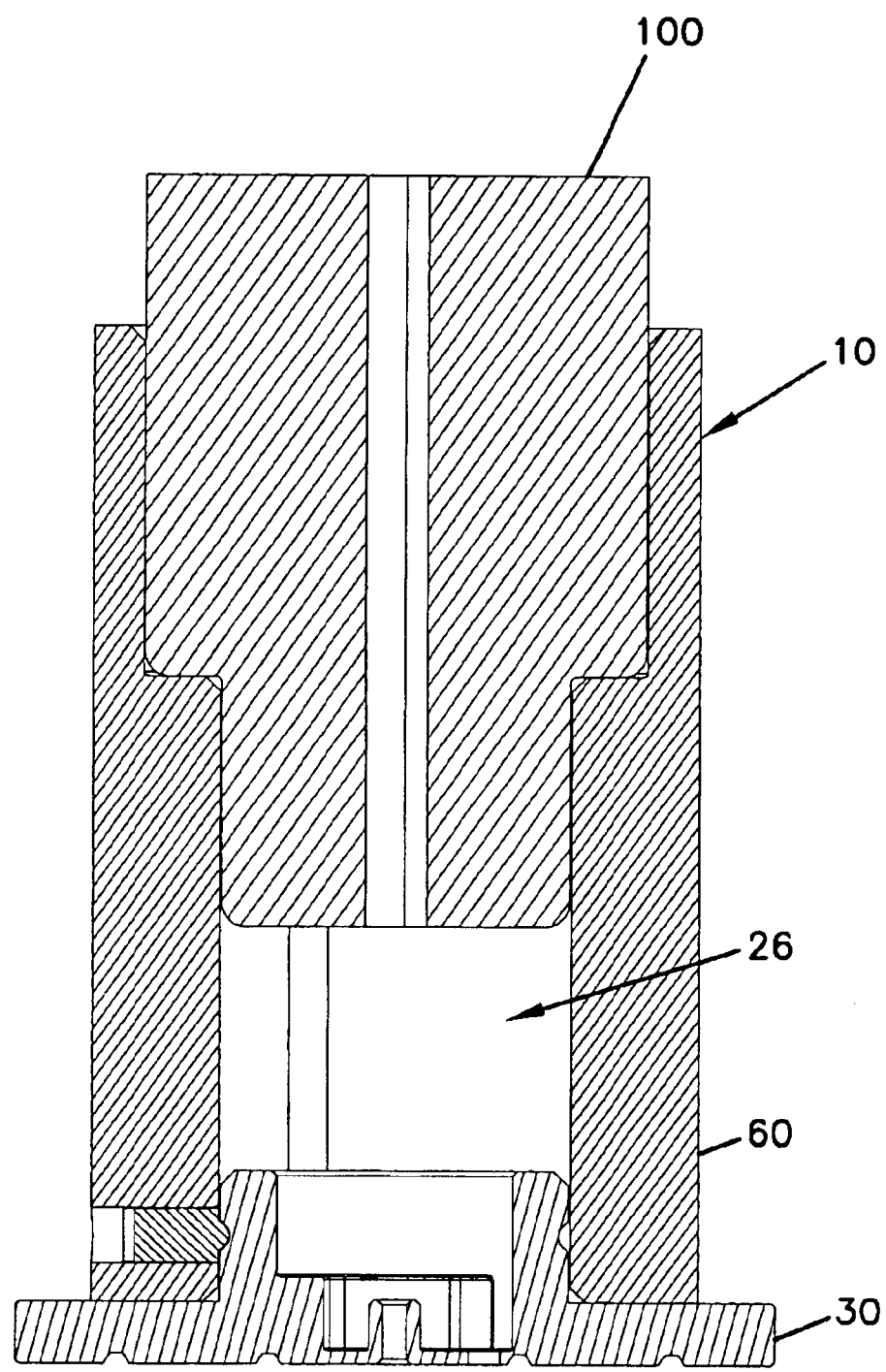
FIG. 24 shows the puck assembly of FIG. 1 in cross-sectional side view.

Puck assembly 10 is smaller than polishing regions 150. During use, puck assembly 10 can be manipulated in a pattern to move end face 14 relative to the polishing film 142d. For example, puck assembly 10 can be moved in a figure-eight pattern, such as shown in FIG. 18. For example, puck base 30 may be about 1.5 inches in diameter, and region 150 may be about 5.1 inches in diameter. Other sizes can be provided as desired. Polishing materials can be sized at 5 inch diameter circles.

Various polishing materials can be used in regions 150. The preferred materials are sheets 142d with polishing elements formed as part of the sheet. The grit size and backing type can be varied as desired. Various supporting layers 142a, 142b and c may also be provided. Layer 142a can be a foam sheet. Layers 142b, c can be Mylar sheets. Such supporting layers provide cushioning to the polishing sheet 142d, and can affect the radius of curvature of the face 14 of connector 12.

EXAMPLE

One example polishing operation is as follows:

| Materials: | Pocket 150a | Pocket 150b | Pocket 150c | Pocket 150d |
|---|---|---|---|---|
| Foam Sheet(s) | none | none | 1 sheet | 1 sheet |
| Mylar Sheet(s) | 1 sheet | 1 sheet | 5 sheets | 5 sheets |
| Polishing Film | 5 μm SiC sheet | 1 μm diamond sheet | 0.5 μm diamond sheet | 0.02 μm SiO$_2$ sheet |

Note:
The example Mylar sheet is 3 mil thick, and the example foam sheet is a foam lap cushion from Minnesota Mining & Manufacturing, St. Paul, MN, thickness of 0.014 inches. The polishing films are also from Minnesota Mining & Manufacturing, and are made with 3 mil thick polyester backings.

Polishing Procedure:

Step 1: Place connector 12 in polishing puck base 30 but do not snap on puck top 60 or weight 100. Use a sheet of SiC film to gently hand polish off the sharp fiber stub. The puck base 30 and connector 12 should be held vertically with the connector 12 pointing upwards. The film should be moved relative to the puck base 30. The puck base 30 glides the film so the end of the ferrule 16 is not over polished.

Step 2: Attach the puck top 60 and polishing weight 100 to the puck base 30. The weight 100 should rest against the back of the connector 12 and the ferrule 16 should move freely in the puck. The weight is 125 grams. The weight 100 will be used for all the remaining polishing steps. Place the puck assembly 10 on the SiC sheet in Pocket 150a. Move the puck assembly 10 in a figure eight motion making the figure eights as rounded and uniform as possible. Perform 10 figure eights.

Step 3: Wet the polishing film in Pocket 150b with water. A puddle about an inch in diameter is appropriate. Perform 30 figure eights as in Step 2.

Step 4: Wet the polishing film in Pocket 150c. A puddle about an inch in diameter is appropriate. Perform 30 figure eights as in Step 2.

Step 5: Wet the polishing film in Pocket 150d. A puddle about an inch in diameter is appropriate. Perform 1 and a half figure eights as in Step 2.

Step 6: Remove connector from puck assembly 10.

The above example is for polishing one exemplary connector. Different polishing films, different supporting layers, and different amounts of relative movement can lead to differently polished end faces.

To reduce the allowable movement of puck assembly 10 in polishing region 150, a guide 180 can be received in polishing region 150 to present a smaller polishing zone 182. Guide 180 includes a body 184 having upper and lower surfaces 186, 188. A circular outer wall 190 has a center 192. Outer wall 190 just fits within sidewall 156 of pocket 150. Inner circular wall 194 has a center 196 offset from center 192. In one example, outer wall 190 has a diameter of about 5.0 inches, and inner wall has a diameter about 2.5 inches. Other sizes can be provided as desired. A plastic construction for guide 180 is one type of material that can be chosen.

By offsetting the centers, more of the polishing media can be used for multiple end face polishings by rotating guide 180 relative to the polishing media. Center opening 194 allows for a reduced range of motion of puck assembly 10 by the user. One range of motion facilitated by guide 180 is a circular motion around the inner wall 194 where edge surface 36 of puck assembly 10 tracks inner wall 194.

Guide 180 is particularly useful for aggressive or precise polishing where more precise movement by the puck assembly 10 is desired. For example, one rotation of puck assembly 10 may be all that is desired. The guide may be advantageous to reduce user variations that may occur if the user is instructed to free hand a figure eight or other shape approximately a certain dimension in size.

Grooves 48 in puck base 30 of puck assembly 10 assist during polishing by providing an area for loose particulate to reside. Also, when water or other polishing fluid is used, the grooves 48 help prevent puck assembly 10 from sticking to the polishing film, such as through suction developed by the bottom surface against polishing film.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A polishing puck assembly for holding a fiber optic connector comprising:
   a puck member including a planar bottom, and a longitudinal axis perpendicular to the planar bottom, the puck member defining a hole through the puck member coaxial with the longitudinal axis, the hole sized for receiving an optical fiber of the fiber optic connector;
   a weight slidably mounted to the puck member, the weight including a lower surface facing in the same direction as the planar bottom of the puck member;
   the puck member and the weight defining a chamber for receipt of fiber optic connector wherein the lower surface of the weight rests on a rearward facing component of the connector, and wherein the optical fiber protrudes through the hole through the puck member.

2. The puck assembly of claim 1, wherein the puck member includes a base portion, and an upper portion, the upper portion releasably mounted to the base portion, the upper portion including a longitudinal slot extending parallel to the longitudinal axis.

3. The puck assembly of claim 2, wherein the upper portion is mounted to the base portion with a ball and groove arrangement, wherein the ball is spring loaded, and wherein the groove engaged with the ball is circular.

4. The puck assembly of claim 2, wherein the upper portion includes an axial bore and an inner shoulder transverse to the axial bore, a lower portion of the axial bore defining a first diameter, an upper portion of the axial bore defining an inner diameter greater than the inner diameter of the lower portion, the weight including a shoulder engageable with the shoulder of the upper portion to limit sliding movement of the weight relative to the upper portion.

5. The puck assembly of claim 1, wherein the weight includes a longitudinal slot extending parallel to the longitudinal axis.

6. The puck assembly of claim 1, wherein the weight is releasably mounted to the puck member.

7. The puck assembly of claim 6, wherein the releasable mount includes a ball and groove arrangement, wherein the ball is spring loaded, and wherein the groove engaged with the ball is linear and extends parallel to the longitudinal axis.

8. The puck assembly of claim 1, wherein the planar bottom includes a plurality of linear grooves, the linear grooves defining a crosshatched pattern.

9. A method of polishing a fiber optic connector comprising the steps of:

positioning a fiber optic connector in a puck member, wherein a fiber and a supporting ferrule of the fiber optic connector is positioned in an opening through the puck member extending along a longitudinal axis of the puck member, the puck member having a bottom surface defining a plane perpendicular to the longitudinal axis;

slidably mounting a weight to the puck member, wherein the weight is slidable in a direction of the longitudinal axis;

resting the weight on a rearward-facing surface of the fiber optic connector, wherein the ferrule protrudes below the bottom surface of the puck member;

moving the puck member relative to a polishing surface to polish the fiber.

10. The method of claim 9, further comprising the step of positioning a cable connected to the fiber optic connector in a slot extending through the weight.

11. The method of claim 9, wherein the positioning step comprises the steps of mounting the fiber optic connector to a nest of a puck base of the puck member, positioning a cable connected to the fiber optic connector in a slot extending through a puck top of the puck member, and snapping the puck top to the puck base by pushing the puck top in a direction of a longitudinal axis of the puck base.

12. The method of claim 11, wherein the step of slideably mounting the weight includes the steps of positioning the cable in a slot extending through the weight, and snapping the weight to the puck top by pushing the weight in a direction of the longitudinal axis of the puck base.

* * * * *

UNITED STATES PATENT AND TRADEMARK OFFICE
CERTIFICATE OF CORRECTION

| | | |
|---|---|---|
| PATENT NO. | : 6,790,131 B2 | Page 1 of 1 |
| APPLICATION NO. | : 10/055607 | |
| DATED | : September 14, 2004 | |
| INVENTOR(S) | : Wetenkamp et al. | |

It is certified that error appears in the above-identified patent and that said Letters Patent is hereby corrected as shown below:

Col. 6, line 52, claim 1: "receipt of fiber" should read --receipt of the fiber--

Signed and Sealed this

Eleventh Day of September, 2007

JON W. DUDAS
*Director of the United States Patent and Trademark Office*